(12) United States Patent
Tang et al.

(10) Patent No.: US 11,695,781 B2
(45) Date of Patent: Jul. 4, 2023

(54) METHOD FOR MANAGING COMMUNICATION AUTHORITY BASED ON MULTI-ENERGY EQUIPMENT DATA FLOW USING DIGITAL TWIN AND A SYSTEM THEREOF

(71) Applicant: Guizhou Power Grid Company Limited, Guiyang (CN)

(72) Inventors: Xueyong Tang, Guiyang (CN); Yankan Song, Guiyang (CN); Huijiang Wan, Guiyang (CN); Qinfeng Ma, Guiyang (CN); Zhitong Yu, Guiyang (CN); Bin Sun, Guiyang (CN); Xiang Fan, Guiyang (CN); Ruifeng Zhang, Guiyang (CN); Qingsheng Li, Guiyang (CN); He Yang, Guiyang (CN); Zhen Li, Guiyang (CN); Weijie Qiu, Guiyang (CN); Peng Ai, Guiyang (CN)

(73) Assignee: Guizhou Power Grid Company Limited, Guiyang (CN)

( * ) Notice: Subject to any disclaimer, the term of this patent is extended or adjusted under 35 U.S.C. 154(b) by 162 days.

(21) Appl. No.: 17/165,963

(22) Filed: Feb. 3, 2021

(65) Prior Publication Data

US 2022/0141232 A1     May 5, 2022

(30) Foreign Application Priority Data

Oct. 31, 2020  (CN) .......................... 202011196839.9

(51) Int. Cl.
*H04L 9/40* (2022.01)
*G06F 21/60* (2013.01)

(52) U.S. Cl.
CPC .......... *H04L 63/108* (2013.01); *G06F 21/602* (2013.01); *H04L 63/0428* (2013.01)

(58) Field of Classification Search
None
See application file for complete search history.

(56) References Cited

U.S. PATENT DOCUMENTS

2020/0027096 A1\*   1/2020   Cooner .................. G06Q 40/04

\* cited by examiner

*Primary Examiner* — Brandon Hoffman
(74) *Attorney, Agent, or Firm* — Idea Intellectual Limited; Margaret A. Burke; Sam T. Yip

(57) ABSTRACT

The invention discloses a method for managing communication authority based on multi-energy equipment data flow using digital twin and a system thereof, comprising the following steps: generating a unique permission code; Establishing a data flow interaction channel; utilizing a broadcast detection mechanism to periodically check the data flow communication authority based on the channel and continuously remove the data flow interaction channel that is expired and illegally authorized, thus to complete the data flow communication management. The present invention has the advantages that the management is more scientific, the algorithm is clearer, more efficient and safer, and the level is well arranged; the channel resource utilization rate is improved, filling the gap in the current stage of a method for managing communication authority based on multi-energy equipment data flow using digital twin and a system thereof, and ensuring the real-time mapping between physical entities and virtual images.

11 Claims, 7 Drawing Sheets

METHOD FOR MANAGING COMMUNICATION AUTHORITY BASED ON MULTI-ENERGY EQUIPMENT DATA FLOW USING DIGITAL TWIN AND A SYSTEM THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to Chinese patent application No. 2020111968399 filed on Oct. 31, 2020, and the disclosure of which is incorporated herein by reference in its entirety.

FIELD OF THE INVENTION

The present invention relates to the technical field of data flow communication authority management, in particular to a method for managing communication authority based on multi-energy equipment data flow using digital twin and a system thereof.

BACKGROUND OF THE INVENTION

Currently, the data flow communication authority management of the power system mainly centers around the authority management and access control technology research on the integrated power communication management system. Traditional authority control methods mainly include autonomous access control, mandatory access control, attribute-based access control, and role-based access control. The above four control methods can manage a communication authority through a user's direct authorization; a subject for autonomous access control grants its own right to other subjects, but its energy consumption is badly suitable for large and complex systems; the mandatory access control performs multi-level access control according to an access control strategy developed by the system, but the rules formulated has less flexibility and the application rate is low; the attribute-based authority access control is authorized through user attributes but not directly assigned to users, which has the advantages of supporting large-scale complex systems and high flexibility, but the process is complicated and difficult to manage; the role-based access control assigns roles to users so that users are allowed to access different permissions according to different roles, which has the advantages of easy management and high flexibility, so it is suitable for access control of energy interactions between different businesses; but in case of a dozen of system businesses and frequent changes in permissions, the traditional authority control method may become very complicated.

SUMMARY OF THE INVENTION

The present invention is to solve the technical problem that the method for managing communication authority based on multi-energy equipment data flow using digital twin has the characteristics of various business applications, complex data resource structure, dynamic changes in authority requirements, and real-time & quasi-real-time interaction. The traditional access control method requires manual registration authority when being used for authority management, which makes it difficult to meet the interactive requirements of multi-business applications for massive data, and it is impossible to be applied to digital twin of multi-energy equipment. Therefore, a method for managing communication authority based on multi-energy system data flow using digital twin and a system thereof is not available currently.

The present invention has the beneficial effects that the present invention comprising three modules is more scientific to manage, and the algorithm is clearer and more distinct; the algorithm is more efficient and safer; the channel resource utilization rate is improved; simultaneously, manual registration authority is not required, which fills the gap in the current stage of a method for managing communication authority based on multi-energy equipment data flow using digital twin and a system thereof; the present invention is widely applied to the digital twin cloud service platform of regional multi-energy equipment, provides an efficient interaction and management mechanism for the data flow on the cloud service platform and meets the requirements of multi-business applications for data flow interaction, ensuring the real-time mapping between physical entities and virtual images.

DETAILED DESCRIPTION

Embodiment 1

Figure 1:
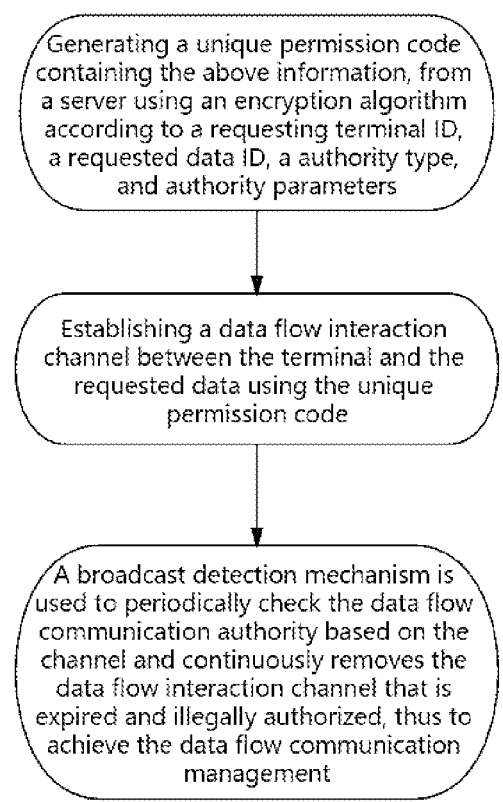
FIG. 1 depicts a basic flowchart of a method of managing communication authority based on multi-energy equipment data flow using digital twin according to an embodiment of the present invention.
Figure 2:
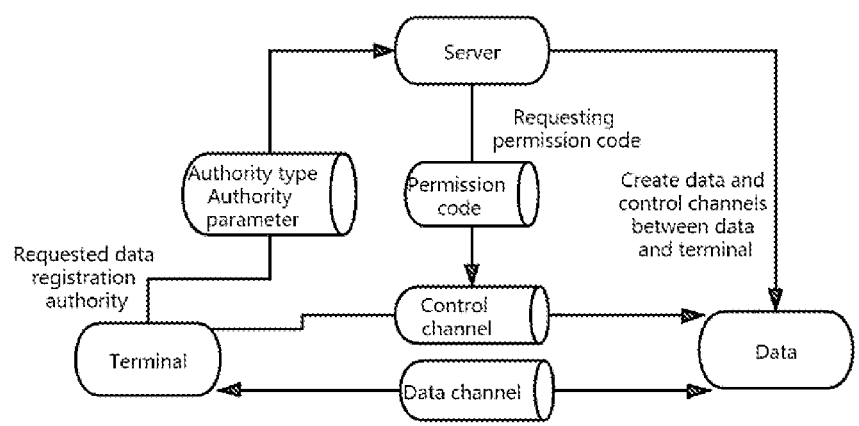
FIG. 2 depicts a diagram of the interaction relationship between the basic elements of a method of managing communication authority based on multi-energy equipment data flow using digital twin according to an embodiment of the present invention.
Figure 3:
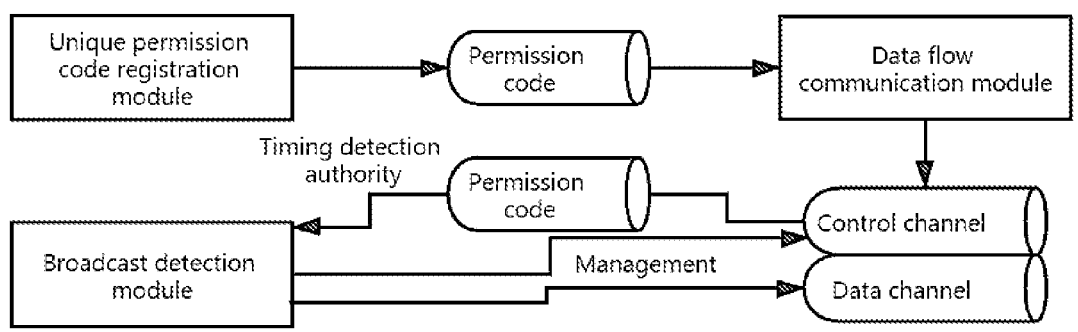
FIG. 3 depicts a dependency diagram between the three modules of a communication authority management system based on multi-energy equipment data flow using digital twin according to an embodiment of the present invention.
Figure 4:
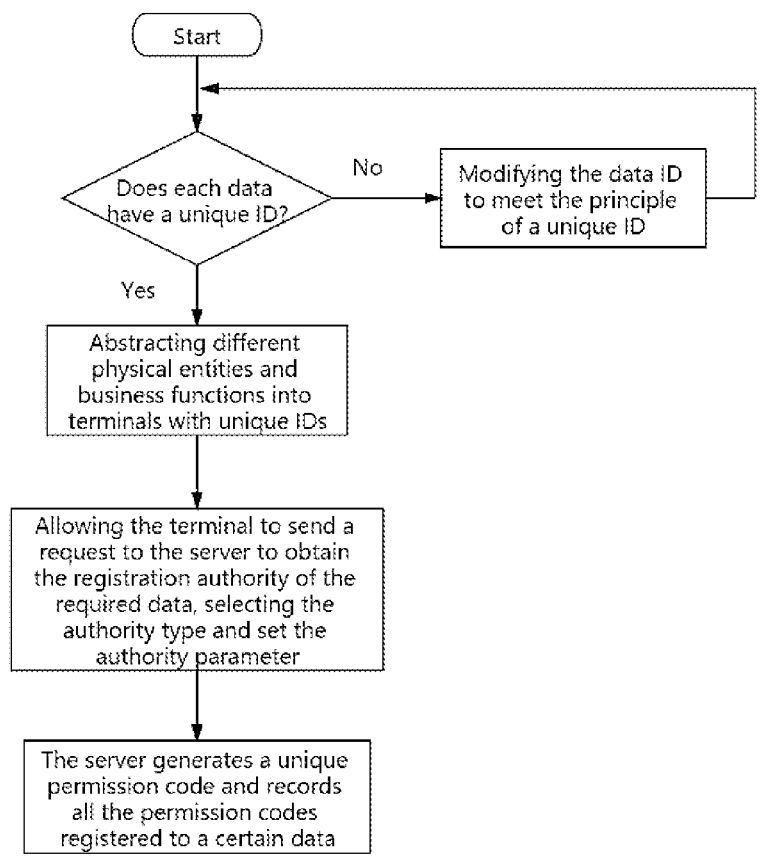
FIG. 4 depicts an algorithm flowchart of a unique permission code registration module of a communication authority management system based on multi-energy equipment data flow using digital twin according to an embodiment of the present invention.
Figure 5:
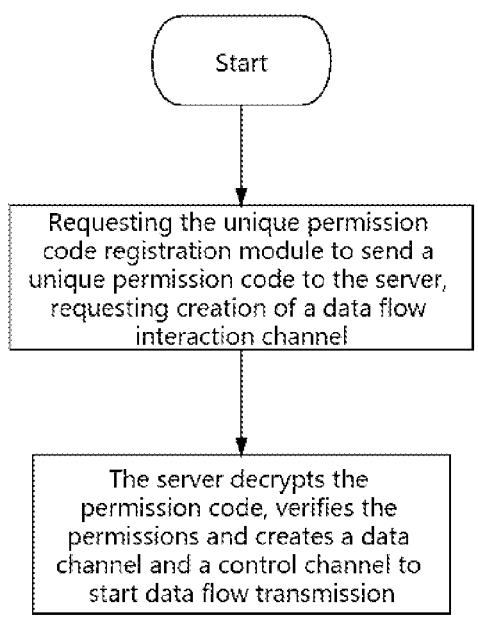
FIG. 5 depicts an algorithm flowchart of a communication authority management system based on multi-energy equipment data flow using digital twin according to an embodiment of the present invention.
Figure 6:
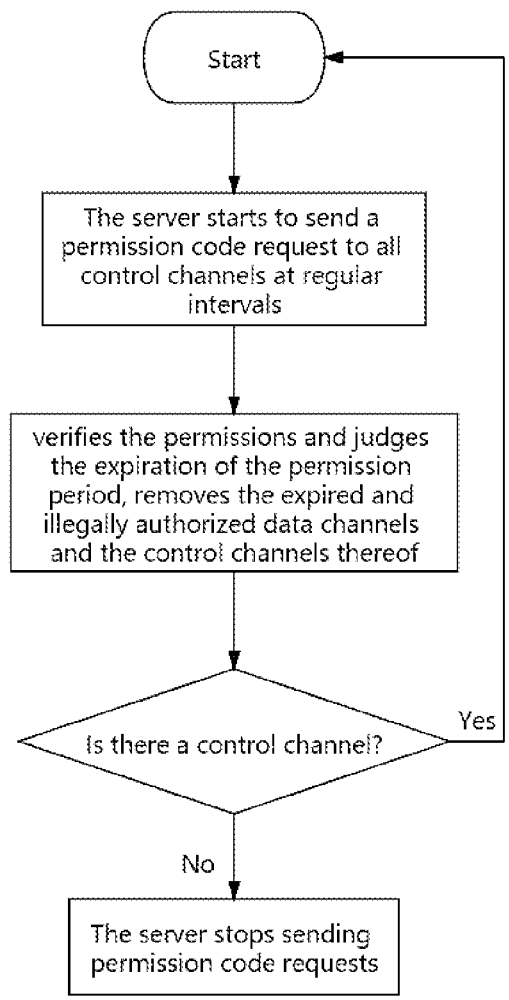
FIG. 6 depicts an algorithm flow chart of the broadcast detection module of a communication authority management system based on multi-energy equipment data flow using digital twin according to an embodiment of the present invention.

As shown in FIGS. 1-2A, a first embodiment of the present invention, provides a method of managing communication authority based on multi-energy equipment data flow using digital twin, comprising:

S1: Generating a unique permission code containing the above information, from a server using an encryption algorithm according to a requesting terminal ID, a requested data ID, an authority type, and authority parameters.

It should be noted that the requesting terminal ID includes,

For physical entities and different types of business applications in digital twin of multi-energy equipment, each terminal is provided with a unique terminal ID;

Wherein, the business applications include modeling, real-time simulation, batch simulation, planning optimization, and operation optimization.

Further, the requested data ID includes:

For a storage module of a single data in a digital twin image of the multi-energy equipment, each data is provided with a unique data ID;

Wherein, the single data includes asset data, measurement data, and simulation data.

The server includes,

A multi-energy equipment digital twin server, comprising a traditional local server and a cloud service platform.

The authority type includes read-only, read and write, and no access.

The authority parameters include a read cycle, a read & write cycle, a permission time limit, and an encryption algorithm type.

Specifically, data flow communication authority management is divided into three stages: requesting data flow registration authority, creating data flow interaction channel, and managing data flow interaction channel; the algorithm flow includes five basic elements of terminal, data, server, channel and registration authorities, wherein:

1) Terminal: refers to the physical entities in the digital twin of the multi-energy system and different types of business applications (modeling, real-time simulation, batch simulation, planning optimization, operation optimization, etc.), with each terminal assigned with a unique terminal ID.

2) Data: refers to a storage module of single data (asset data, measurement data, simulation data, etc.) in the digital twin of the multi-energy system, with each terminal assigned with a unique data ID.

3) Server: refers to a digital twin server of a multi-energy system, which may be a traditional local server or a cloud service platform.

4) Channel: refers to a data interaction channel between terminal and data, which is divided into a data channel and a control channel.

5) Registration authority: refers to an operation authority that a terminal requests to obtain data; the authority type is divided into read-only, read and write, and no access; the authority parameters include a read cycle, a read & write cycle, a permission time limit, and an encryption algorithm type.

To be more specific, the algorithm includes the following steps:

Step 1: abstracting different physical entities and business applications into a terminal with an unique ID, on the basis of ensuring that the model data of each digital twin follows the principle of unique ID;

Step 2: allowing the terminal to send a request to the server to obtain the registration authority of the required data, selecting the authority type and set the authority parameter according to the request;

Step 3: Generating a unique permission code containing the above information, from a server using an encryption algorithm according to a requesting terminal ID, a requested data ID, a authority type, and authority parameters; making a table to record all the permission codes registered to a certain data, wherein the encryption algorithm is considered as an authority registration parameter to be agreed by the terminal and the server, e.g. MD5 code of the Hash algorithm.

S2: Establishing a data flow interaction channel between the terminal and the requested data using the unique permission code;

It should be noted that the data flow interaction channel comprises a data channel and a control channel.

Specifically, the algorithm includes the following steps:

Step 1: Requesting the unique permission code registration module to send a generated unique permission code to the server, requesting creation of a data flow interaction channel;

Step 2: The server decrypts the permission code, verifies the permissions and approves creation of a data channel and a control channel between the terminal and the requested data, and starts data flow communication, wherein the data channel is used to transmit data flow and control channels is used to transmit permission codes;

S3: A broadcast detection mechanism is used to periodically check the data flow communication authority based on the channel and continuously removes the data flow interaction channel that is expired and illegally authorized, thus to achieve the data flow communication management.

Specifically, the algorithm includes the following steps:

Step 1: After all data flow interaction channels are created, the server starts to send a permission code request to all control channels at regular intervals;

Step 2: The server decrypts all permission codes, verifies the permissions and judges the expiration of the permission period, removes the expired and illegally authorized data channels and the control channels thereof, thus to terminate the data interaction with the terminal;

Step 3: The server checks to learn whether all control channels are removed; if so, the server stops sending permission code requests to the control channels; otherwise, go to Step 1 and continue to verify the permissions of all control channels.

Embodiment 2

The embodiment provides a communication authority management system based on multi-energy equipment data flow using digital twin, which specifically comprises three modules of unique permission code registration, data communication, and broadcast detection, and a set of algorithms is proposed for each module. The algorithm and system ensure that the communication authority management based on multi-energy equipment data flow using digital twin becomes safer and more convenient, filling up the gap in the current stage of a method for managing communication authority based on multi-energy equipment data flow using digital twin and a system thereof.

As shown in FIGS. 3-6, a second embodiment of the present invention, different from the first embodiment, provides a communication authority management system based on multi-energy equipment data flow using digital twin, which comprises a unique permission code registration, module, a data flow communication module, and a broadcast detection module, it should be noted that:

A unique permission code registration module is used for providing a permission code to a data flow communication module;

The data flow communication module receives the permission code provided by the unique permission code registration module to build a data channel and a control channel for transmitting the data flow and the permission code;

The broadcast detection module conducts periodical detection of the data flow communication authority through the control channel generated by the data flow communication module, thus to realize management of the data channel and the control channel.

Specifically, the embodiment provides a communication authority management system based on multi-energy equipment data flow using digital twin, and the authority management system specifically comprises three modules: a unique permission code registration module, a data flow communication module, and a broadcast detection module; and a set of algorithm flow is proposed for each module.

To be more specific:

Unique permission code registration module: the module generates a unique permission code including terminal ID, data ID, authority type and authority parameter information, and the terminal requests data registration authority by the permission code.

Data flow communication module: the module uses the unique permission code registration module to generate a unique permission code, and builds a data flow interaction channel between the terminal and the requested data. The algorithm has the specific steps as follows:

Broadcast detection module: the module uses the broadcast detection mechanism, utilizes the control channel established by the data flow communication module to periodically check the data flow communication authority based on the channel and continuously removes the data flow interaction channel that is expired and illegally authorized, thus to achieve the data flow communication management.

Specifically, the relationship between the above three modules is described as: the unique permission code registration module provides a permission code for the data flow communication module; the data flow communication module uses the permission code to build a data channel and a control channel; the broadcast detection module conducts periodical detection of the data flow communication authority through the control channel generated by the data flow communication module, thus to realize management of the data channel and the control channel; the above three modules are deployed on the server, and the terminal only needs to provide the terminal ID and the data ID requested for registration, authority type and authority parameter to the server.

Embodiment 3

Figure 7:
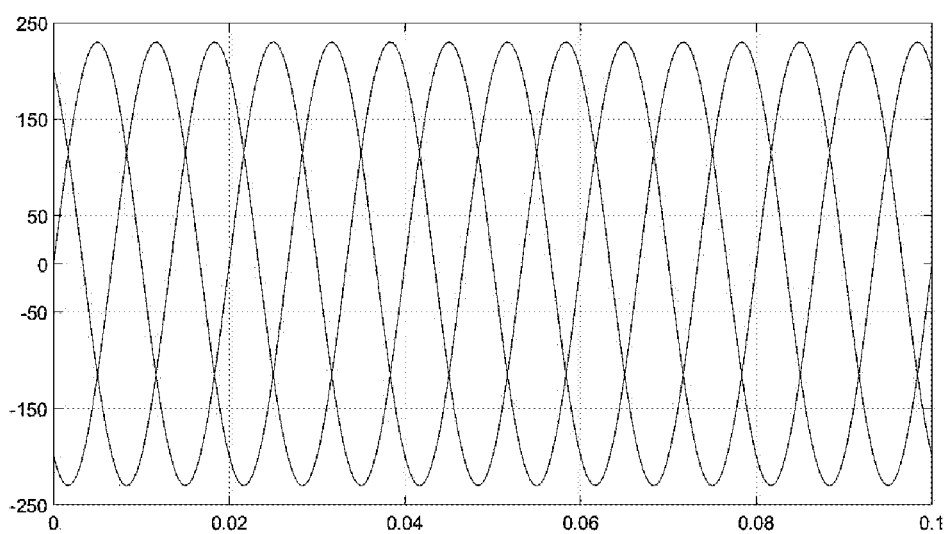
FIG. 7 depicts a diagram of a voltage signal sent by a terminal measurement device of a communication authority management system based on multi-energy equipment data flow using digital twin according to an embodiment of the present invention.

As shown in FIG. 7, a third embodiment of the present invention, conducts an experiment on a method of the present invention to verify the true effect of the method by means of an scientific demonstration method.

It uses C++ language to write the unique permission code registration, data flow communication and broadcast detection modules of the present invention, and deploys them on a local server.

The terminal mentioned in the embodiment is a digital twin busbar voltage measuring device of a multi-energy system deployed on a remote server; the purpose of the embodiment is that: firstly, the device measures the busbar voltage at an installation point, and then requests to obtain the access authority of the busbar voltage data storage module on the local server, then establishes a data flow interaction channel, and finally writes a measurement signal into the busbar voltage data storage module.

Next, the embodiment will be used to test the communication authority management system and algorithm proposed by the present invention.

It is required to starting the unique permission code registration module to allow the busbar voltage measurement device to send a request to the local server through the remote server, and the standard format of the request content is shown in the table below.

TABLE 1

Standard format of requested content

| | | | | Authority parameter | | |
|---|---|---|---|---|---|---|
| Terminal ID | Data ID | Authority type | Read cycle | Read & write cycle | Permission time limit | Encryption algorithm type |
| No. 1 busbar voltage measuring device | No. 1 busbar voltage | Read and write | | 2 min | Start time: 2020 Sep. 20-18:00 End time: 2020 Sep. 20-18:10 | MD5 code |

The local server receives the content of the request and organizes it into a string text containing complete information: "No. 1 busbar voltage measuring device", "No. 1 busbar voltage", "read and write", " " "5 min", and "start time: 2020-9-20-18:00; end time: 2020-9-20-18:30" "MD5 code"; uses the MD5 encryption algorithm to encrypt the said string text into a 32-bit lowercase MD5 code with "fcc6c0126da48eed8a00872ad819ff83" as the only permission code, and create a table to record.

Upon starting, the data flow communication module requests the unique permission code registration module to send a generated unique permission code to the local server; the server will decrypt the permission code through the local server, verify the permission and approves to a data channel and a control channel between the requested data storage module and the remote server; the channel is established at 2020-9-20-18:00, and the delay is ms level.

The data channel is used to transmit a busbar voltage signal measured by the terminal measuring device and send it to the busbar voltage data storage module in a time sequence. The voltage signal is shown in FIG. 7, data is read and written every 2 minutes, and the control channel is used for transmitting the permission code.

After starting the broadcast detection module, the local server starts to send a permission code request to the control channel every 1 minute (decided according to the authority cycle), decrypts the permission code obtained, verifies the permissions and judges the expiration of the permission period; the local server continues sending permission code requests until 2020-9-20-18: 11, if the permission is detected as expired, the data channel and control channel are deleted, the local service stops sending permission code requests to the control channel, thus to end data flow communication, the busbar voltage measuring device successfully writes a measurement signal into the data storage module.

It should be recognized that, embodiments of the invention may be realized or implemented by computer hardware, a combination of hardware and software, or by computer instructions stored in non-transient computer-readable memory. The method can be implemented in a computer program using standard programming techniques (including a non-transient computer-readable storage medium configured with computer programs), wherein the storage medium configured in this way enable the computer to operate in specific and predefined ways—according to the method described in specific embodiments and figures. Each program can be implemented in a high-level process or object-oriented programming language to communicate with a computer system. However, the program can be implemented in assembly or machine language as required. In any cases, the language can be compiled or interpreted. In addition, the program can be run on a dedicated integrated circuit programmed for the purpose.

The procedures described herein in any appropriate order can be followed, unless otherwise indicated or otherwise obviously inconsistent with the context. The procedures described herein (or variations and/or combinations thereof) can be executed under the control of one or more computer systems configured with executable instructions, and can be implemented as code (for example, an executable instruction, one or more computer programs, or one or more applications), hardware, or a hardware combination that execute together on one or more processors. The computer program comprises a plurality of instructions that can be executed by one or more processors.

Furthermore, the method can be implemented in any type of computing platform that is operationally connected to the appropriate one, including but not limited to personal computer, minicomputer, master frame, workstation, network or distributed computing environment, separate or integrated computer platform, or communication with charged particle tools or other imaging devices, etc. The invention may be realized by machine-readable codes stored on a non-transient computer-readable storage medium or device, whether the storage medium is mobile or integrated into a computing platform, such as hard disk, optical reading and/or write-in storage medium, RAM and ROM; the storage medium is readable by a programmable computer, when the storage medium or device is read by a computer, it may be used to configure and operate the computer to perform the procedures described herein. In addition, machine-readable code, or parts of it, can be transmitted over wired or wireless networks. When the medium (combined with a microprocessor or other data processor) is used to implement the procedures described above, the invention comprises these and other different types of non-transient computer-readable storage media. The invention also comprises the computer itself when programming according to the method and techniques described in the present invention. A computer program can be applied to the input data to perform the functions described herein, so that the input data is transformed to generate output data stored in non-volatile memory. The output information can also be applied to one or more output devices, such as a display. In the preferred embodiment of the invention, the transformed data represents physical objects, including a specific visual representation of physical objects produced on the display.

What is claimed is:

1. A method for managing communication authority based on multi-energy equipment data flow using digital twin, which is characterized by comprising the steps below:
   generating, by a server, a unique permission code using an encryption algorithm according to a requesting terminal ID, a requested data ID, an authority type, and authority parameters, wherein the unique permission code contains the requesting terminal ID, the requested data ID, the authority type, and the authority parameters;
   establishing a data flow interaction channel between the terminal and the requested data using the unique permission code;
   utilizing a broadcast detection mechanism to periodically check the data flow communication authority based on the channel and continuously removes the data flow interaction channel that is expired and illegally authorized, thus to complete the data flow communication management.

2. The method for managing communication authority based on multi-energy equipment data flow using digital twin according to claim 1, wherein the method is characterized in that the requesting terminal ID comprises: for physical entities and different types of business applications in digital twin of multi-energy equipment, each terminal is provided with a unique terminal ID.

3. The method for managing communication authority based on multi-energy equipment data flow using digital twin according to claim 1, wherein the method is characterized in that the requested data ID comprises: for a storage module of a single data in a digital twin image of the multi-energy equipment, each data is provided with a unique data ID.

4. The method for managing communication authority based on multi-energy equipment data flow using digital twin according to claim 3, wherein the method is characterized in that the server comprises: a multi-energy equipment digital twin server, comprising a traditional local server and a cloud service platform.

5. The method for managing communication authority based on multi-energy equipment data flow using digital twin according to claim 4, wherein the method is characterized in that the authority type includes read-only, read and write, and no access.

6. The method for managing communication authority based on multi-energy equipment data flow using digital twin according to claim 5, wherein the method is characterized in that the authority parameters include a read cycle, a read & write cycle, a permission time limit, and an encryption algorithm type.

7. The method for managing communication authority based on multi-energy equipment data flow using digital twin according to claim 1, wherein the method is characterized in that the data flow interaction channel comprises a data channel and a control channel.

8. The method for managing communication authority based on multi-energy equipment data flow using digital twin according to claim 5, wherein the method is characterized in that the data flow interaction channel comprises a data channel and a control channel.

9. The method for managing communication authority based on multi-energy equipment data flow using digital twin according to claim 1, wherein the method is characterized in that the business application includes modeling, real-time simulation, batch simulation, planning optimization, and operation optimization.

10. The method for managing communication authority based on multi-energy equipment data flow using digital twin according to claim 9, wherein the method is characterized in that the single data includes asset data, measurement data, and simulation data.

11. A system for managing communication authority based on a multi-energy equipment data flow using digital twin, the system is characterized by comprising:
   a unique permission code registration module is used for providing a permission code to a data flow communication module;
   the data flow communication module receives the permission code provided by the unique permission code registration module to build a data channel and a control channel for transmitting the data flow and the permission code;
   the broadcast detection module conducts periodical detection of the data flow communication authority through the control channel generated by the data flow communication module, thus to realize management of the data channel and the control channel;
   wherein the multi-energy equipment data flow using digital twin is characterized by comprising the steps below:
      generating, by a server, a unique permission code using an encryption algorithm according to a requesting terminal ID, a requested data ID, an authority type, and authority parameters, wherein the unique permission code contains the requesting terminal ID, the requested data ID, the authority type, and the authority parameters;
      establishing a data flow interaction channel between the terminal and the requested data using the unique permission code; and
      utilizing a broadcast detection mechanism to periodically check the data flow communication authority based on the channel and continuously removes the data flow interaction channel that is expired and illegally authorized, thus to complete the data flow communication management.

* * * * *